United States Patent [19]

Habert et al.

[11] 4,045,277
[45] Aug. 30, 1977

[54] PNEUMATIC TIRE BUILDING DRUM

[75] Inventors: William C. Habert, Grosse Pointe Farms; Jasjit S. Jawanda, Troy, both of Mich.

[73] Assignee: Uniroyal, Inc., New York, N.Y.

[21] Appl. No.: 685,203

[22] Filed: May 11, 1976

[51] Int. Cl.² .................. B29H 17/16; B29H 17/22
[52] U.S. Cl. .................................. 156/417; 156/400; 156/419
[58] Field of Search .......................... 156/400–403, 156/414, 415, 416, 417–420, 431, 432, 435

[56] References Cited

U.S. PATENT DOCUMENTS

| | | | |
|---|---|---|---|
| 1,926,345 | 9/1933 | Miller | 156/420 |
| 2,145,806 | 1/1939 | Schnedarek | 156/419 |
| 2,951,526 | 9/1960 | Haase | 156/401 |
| 3,077,917 | 2/1963 | Appleby | 156/416 |
| 3,121,652 | 2/1964 | Borglin et al. | 156/400 |
| 3,281,305 | 10/1966 | Nadler et al. | 156/401 |
| 3,745,085 | 7/1973 | Bertrand et al. | 156/417 |

FOREIGN PATENT DOCUMENTS

| | | | |
|---|---|---|---|
| 1,519,771 | 4/1968 | France | 156/400 |

*Primary Examiner*—Charles E. Van Horn
*Assistant Examiner*—John E. Kittle
*Attorney, Agent, or Firm*—Philip Sands

[57] ABSTRACT

A building drum for building first-stage, steel-reinforced, radial monoply, pneumatic tire carcasses, is disclosed. The drum comprises a circumferential array of drum-forming segments which are supported for radial displacement to and from contracted and expanded dispositions, and apparatus for displacing the segments radially between the contracted and expanded dispositions. Each of the segments has the same axial extent and terminates at each end in a respective flange projecting radially inwardly. Each of the flanges has a respective recess exposed radially outwardly, corresponding ones of the recesses which are at the same segment end defining co-operatively with one another at each such segment end a radially outwardly exposed annular bead-seat. The segments, when in a fully contracted disposition, present a substantially cylindrical outer carcass-ply support-surface having a diameter which is less than the inner diameter of any annular metallic bead-core to be thereby operated upon.

3 Claims, 3 Drawing Figures

PNEUMATIC TIRE BUILDING DRUM

The foregoing abstract is neither intended to define the invention disclosed in the specification, nor is it intended to limit the scope of the invention in any way.

BACKGROUND OF THE INVENTION

The present invention relates generally to the field of building pneumatic tires and, more particularly, to a cylindrical drum for building first-stage (raw or uncured), steel-reinforced, radial monoply, pneumatic tire carcasses, whereby a pair of carcass-bead-defining annular metallic cores are secured to the opposite end portions, respectively, of a cylindrically-oriented carcass-ply.

The building drum of the present invention is conventionally characterized as a "shouldered" or "high crown" drum having a substantially cylindrical configuration and terminating at each of its opposite ends in an annular bead-seat having a diameter which is substantially less than the diameter of the cylindrical portion of the drum between the bead-seats. In particular, the drum itself is defined by a circumferential array of drum-forming segments which are radially expansible and contractible, each of the segments having the same axial extent and terminating at each end in a respective flange projecting radially inwardly. Each of the flanges has a respective recess exposed radially outwardly. Corresponding ones of the recesses which are the same segment end define cooperatively with one another at each such segment end a radially outwardly exposed annualar bead-seat.

Such a segmented drum is disclosed in U.S. Pat. No. 3,281,305, issued on Oct. 25, 1966 to H. Nadler, et al. Such a drum is utilized to build first-stage carcasses by contracting the segments radially such that the segments are moved into a minimum diameter-defining disposition. A carcass ply is then wrapped around the drum segments into a cylindrical disposition, the cylindrically-oriented ply having an axial span which at each of its opposite ends extends over and beyond the aforementioned annular bead-seats, respectively. The carcass-ply may overlie an appropriate liner material which is generally coextensive therewith, and may have associated therewith appropriate bead-region filler strips and chafer strips which overlie the opposite end portions thereof in radial alignment with respective ones of the bead-seats.

A pair of carcass-bead-defining annular metallic cores are then disposed concentrically around the drum in radial alignment with respective ones of the bead-seats, each of the annular metallic cores having affixed thereto, in surrounding relation, a respective annular apex strip which is generally triangular in cross-section. The segments are then radially expanded such that the cylindrically-oriented carcass-ply is stretched circumferentially until each of the bead-seats effectively engages a respective one of the annular metallic cores through the intermediary of a respective one of the opposite end portions of the cylindrically oriented carcass-ply. Engagement of the bead-seats with the annular metallic cores, respectively, causes the opposite end portions of the carcass-ply to turn slightly upwardly about the cores and embrace the latter. The end portions of the carcass-ply are then turned upwardly further and "stitched" into adherence with the upper exposed cylindrical surface of the carcass-ply between the annular metallic cores. The drum segments are then contracted once again and the carcass-ply with the annular metallic cores secured to the opposite end portions thereof is removed from th drum in the form of a "first-stage" (raw or uncured) pneumatic tire carcass.

The disadvantage associated with the building drum of the aforementioned Nadler, et al. disclosure is that each of the bead-seats is formed in a respective elastomeric ring which is affixed to and surrounds the circumferential array of drum-forming segments at each of the end portions of the drum. As a result, when the segments are expanded, the elastomeric ring, and consequently the bead-seat-defining annular groove in the elastomeric ring, is caused to stretch both axially and radially, whereby the depth of the annular groove is reduced slightly and the width of the annular groove is increased slightly. The net result is that each of the bead-seats deforms with the expansion and contraction of the drum-forming segments and does not present a distortion-free configuration for turning up and anchoring a respective carcass-ply end portion around a corresponding annular metallic core without distorting the carcass-ply ends themselves. Such distortion often interferes with the quality, and thus utility, of such a carcass.

The problem of bead-region distortion becomes pronounced when building heavy service pneumatic tire carcasses of the steel-reinforced, radial monoply variety for trucks and other large commercial vehicles. The problem is pronounced because of the extreme stiffness of such a radial monoply and the difficulty to neatly turn and anchor (without excessive distortion) the end portions of the monoply around corresponding annular metallic cores and associated apex strips.

Because of the extreme stiffness of the steel-reinforced, radial monoply, and the distortion that each of the bead-seats undergoes in the building drum disclosed in the aforementioned Nadler et al. patent, a drum of such construction is unsuitable for building steel-reinforced, radial monoply, first-stage carcasses. It is just such a disadvantage that the present invention overcomes.

SUMMARY OF THE INVENTION

Accordingly, it is an object of the present invention to provide an improved segmental drum for building first-stage, steel-reinforced, radial monoply, pneumatic tire carcasses.

It is a further object of the present invention to build such first-stage carcasses such that the bead-region components thereof, namely the annular metallic cores and their respective apex strips, are secured to the carcass-ply with an orientation which is as close as possible to the ultimate orientation they are to assume when the first-stage carcass is subsequently transformed into a second-stage carcass and cured in the form of a torus. Such an orientation is near perpendicular to the common axis of the annular metallic cores and the drum upon which the carcass-ply in cylindrical form is arranged. As a result, the annular metallic cores and their corresponding apex strips need not undergo substantial rotation relative to the carcass-ply when the first-stage carcass is transformed into a second-stage carcass and subsequently cured in the form of a torus, which rotation may otherwise result in bead-region distortion and in a pneumatic tire of unacceptable quality.

It is still another object of the present invention to provide a segmental building drum for pneumatic tires having bead-seats which are entirely rigid and, thereby, have a depth-to-width ratio that does not vary with the expansion and contraction of the segments.

It is an additional object of the present invention to provide a segmental building drum for pneumatic tires having bead-seats which in axial cross-section closely conform to the cross-section (axially of the drum) of the annular metallic cores to be thereby operated upon, and which are capable of turning up the opposite end portions of the carcass-ply around the annular metallic cores into a substantially vertical disposition so that such end portions can subsequently be easily stitched to the carcass-ply over the cores.

With the above objects in view, the present invention may be characterized as a building drum for building first-stage, steel-reinforced, radial monoply, pneumatic tire carcasses, whereby a pair of carcass-bead-defining annular metallic cores are secured to the opposite end portions, respectively, of a cylindrically-oriented carcass ply. The drum comprises a circumferential array of drum-forming segments, guide means supporting the segments for radial displacement to and from contracted and expanded dispositions, and shifting means for displacing the segments radially between the contracted and expanded dispositions.

Each of the segments has the same axial extent and terminates at each end in a respective flange projecting radially inwardly, each of the flanges having a respective recess exposed radially outwardly. Corresponding ones of the recesses which are at the same segment end define cooperatively with one another at each such segment end a radially ouwardly exposed annular bead-seat. The bead-seats are entirely rigid and, thereby, have a depth-to-width ratio that does not vary with the expansion and contraction of the segments.

Each of the bead-seats in cross-section, axially of the segments, has an arcuate extent sufficient to vertically embrace a respective carcass-bead-defining annular metallic core over approximately 180° of the core. The radial depth of each of the bead-seats measured from the outer surface of the drum to the radially innermost portion of each bead-seat is preferably in excess of three times the radial thickness of the carcass-bead-defining annular metallic core.

BRIEF DESCRIPTION OF THE DRAWINGS

The above and additional objects and advantages of the present invention will be more clearly understood from the following detailed description thereof when read in conjunction with the accompanying drawings, in which.

DETAILED DESCRIPTION OF THE INVENTION

Figure 1:
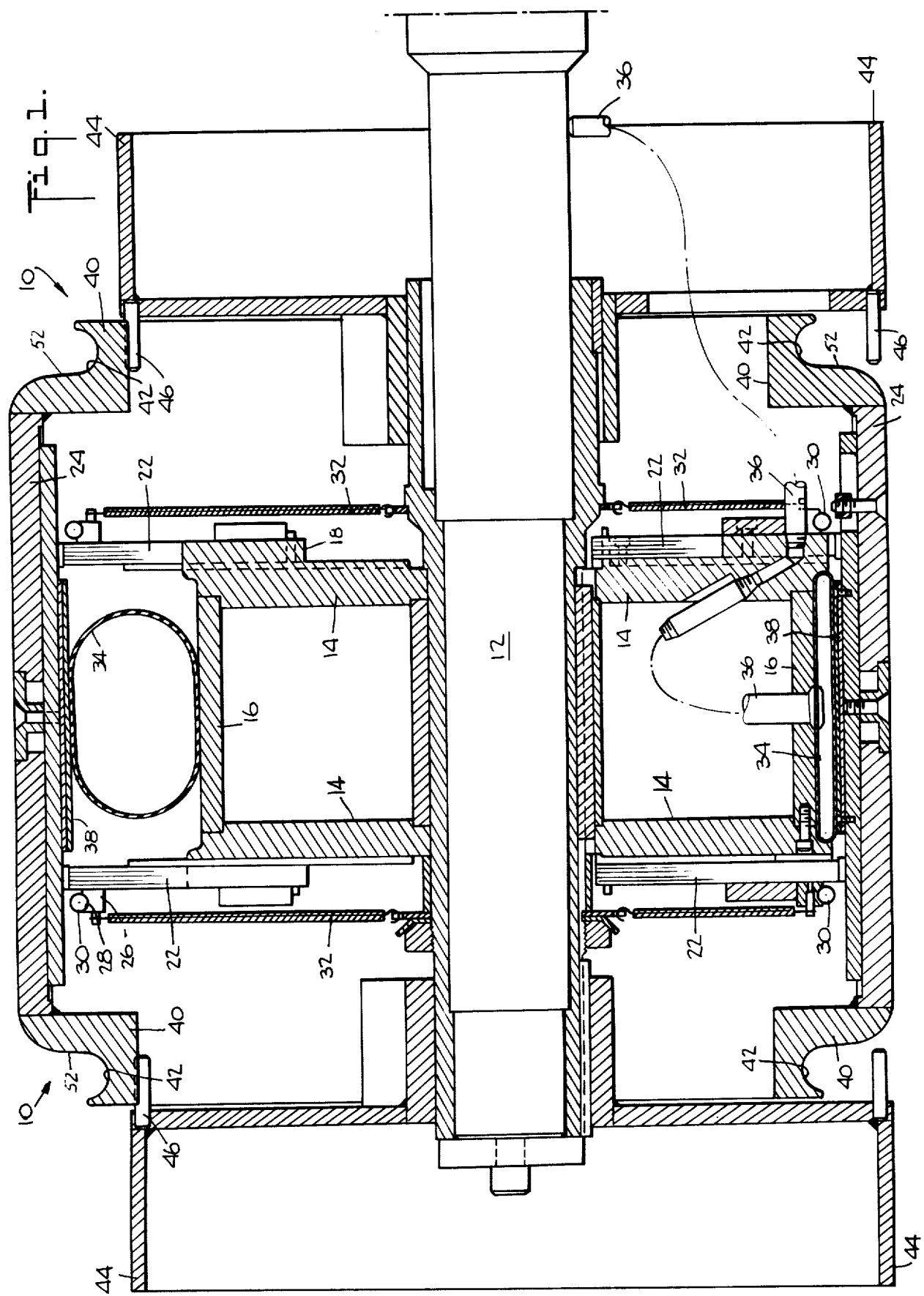
FIG. 1 is an axially taken cross-sectional view of the drum of the present invention, the upper portion thereof illustrated in an expanded condition and the lower portion thereof illustrated in a contracted condition.
Figure 2:
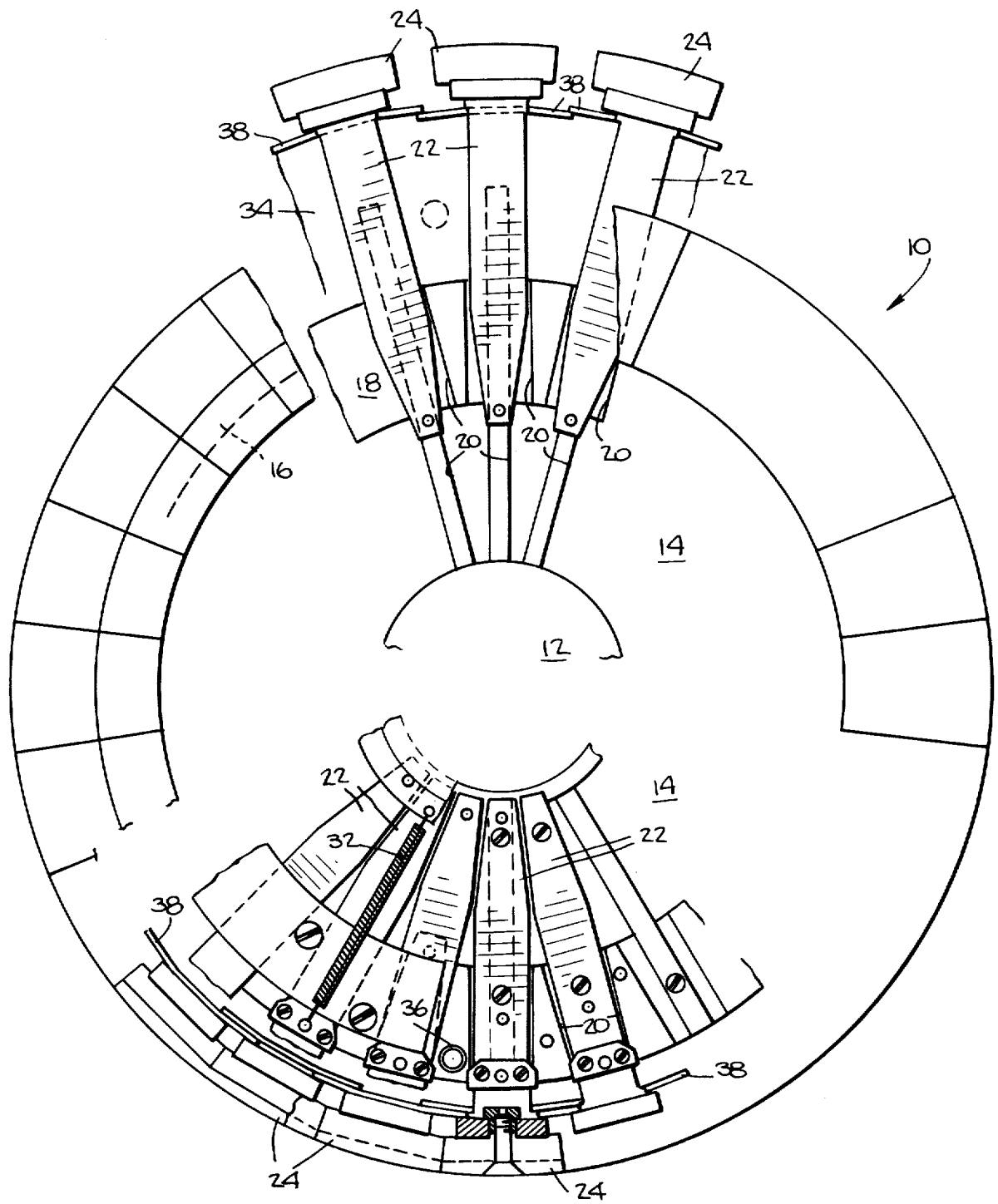
FIG. 2 is a fragmentary, radially taken cross-sectional view of the drum illustrated in FIG. 1, the upper portion thereof illustrated in an expanded condition, and the lower portion thereof illustrated in a contracted condition.

Referring now to the drawings and more particularly to FIGS. 1 and 2, the present invention relates to a pneumatic tire carcass building drum denoted generally by the reference character 10. The drum 10 includes an axially hollow hub portion 12 which is adapted to be mounted upon a shaft (not shown) for rotating the drum 10. Affixed to the medial region of the hub portion 12 is a pair of annular plates 14 which are stabilized adjacent to their outer periphery by a cylinder 16 which bridges the annular plates 14. Each of the annular plates 14 is provided with an outer annular shoulder 18 in which is formed a radial array of equidistantly spaced slots 20 (FIG. 2). In each of the slots 20, there is slidably confined one of a pair of legs 22 which are fixedly connected to each of a plurality of segments 24 extending in a circumferential array around the hub portion 12. The legs 22, and thus the segments 24, are displaceable radially from a contracted condition as illustrated in the lower portion of each of FIGS. 1 and 2 to an expanded condition as illustrated in the upper portion of each of FIGS. 1 and 2.

Each of the legs 22 is provided with a lug 26 just beneath its corresponding one of the segments 24, each of which lugs 26 is formed with a cut-out 28. Each such cut-out 28, cooperatively with the other cut-outs of the other legs 22 at the same shoulder 18, defines an annular recess in which is confined an annularly arranged tension (coil) spring 30 which functions as a garter to urge all of the segments 24 to a common contracted disposition. Coacting with each spring 30 are a plurality of linearly arranged tension (coil) springs 32, the opposite ends of which springs 32 are secured on the one hand to a respective one of the lugs 26 and on the other hand commonly to the hub portion 12.

An annular inflatable bladder 34 is interposed between the cylinder 16 which bridges the annular plates 14 and the inner portion of each of the segments 24 between the legs 22. A hose 36 shown in fragmented fashion is utilized for injecting (and exhausting) a pressurized fluid into the bladder 34 for inflating (and deflating) the latter selectively. As best illustrated in FIG. 2, each of the legs 22 has associated therewith a shield 38 which presents a concavity confronting and engaging the bladder 34. The shields 38 always remain in overlapping relation with one another continually over the expansion and contraction of the segments 24 to prevent various portions of the bladder 34 from squeezing radially outwardly between the segments 24.

Each of the segments 24 is provided at either end thereof with a flange 40 which projects radially inwardly. Each flange 40 is provided with a recess 42 which cooperatively with the other such recesses 42 at the same segment end define a radially outwardly exposed, groove-like, annular bead-seat, the function of which will be clarified below.

Concentrically disposed on each side of the circumferential array of segments 24, is an inextensible cylindrical drum portion 44. Each of the drum portions 44 is spaced adjacent to the opposite end portions of the segments 24 to allow the segments 24 to be radially displaced inwardly and outwardly. Each of the drum portions 44 is provided with a circumferential array of axially extending and equidistantly spaced fingers 46 which are so disposed at the spaces between adjacent ones of the segments 24 that the fingers do not interfere with the radial displacement of the segments 24 inwardly and outwardly.

The diameter of each drum portion 44 is identical to the diameter of the circumferential array of drum-forming segments 24 when the latter are in their most fully contracted condition as illustrated in the lower portion of FIG. 1. The fingers 46 have an axial extent which is sufficient to extend substantially across each of the recesses 42 formed in the flanges 40 of the segments 24, and thus the fingers 46 present means for substantially bridging the gap between the inextensible drum portions 44 and the segments 24 when the latter are in their most fully contracted condition.

An important aspect of the present invention involves the configuration, in axial cross-section, of each of the recesses 42 formed in the flanges 40 of the segments 42. Since the drum 10 of the present invention has the function of building first-stage, steel-reinforced, radial monoply carcasses, which carcasses are extremely stiff, the recessed flanges 40 must be capable of effectively turning up the opposite end portions of each cylindrically oriented carcass monoply, without wrinkling and distorting the carcass components in the bead-regions. In order to effectively turn-up the end portions of the carcass monoply without wrinkling the latter in the bead-regions, the outer surfaces of the recesses 42 should preferably conform to the cross-sectional configuration of the annular metallic core 48 (FIG. 3) which defines each carcass bead-region and which is anchored to each of the opposite end portions of the carcass monoply.

Figure 3:
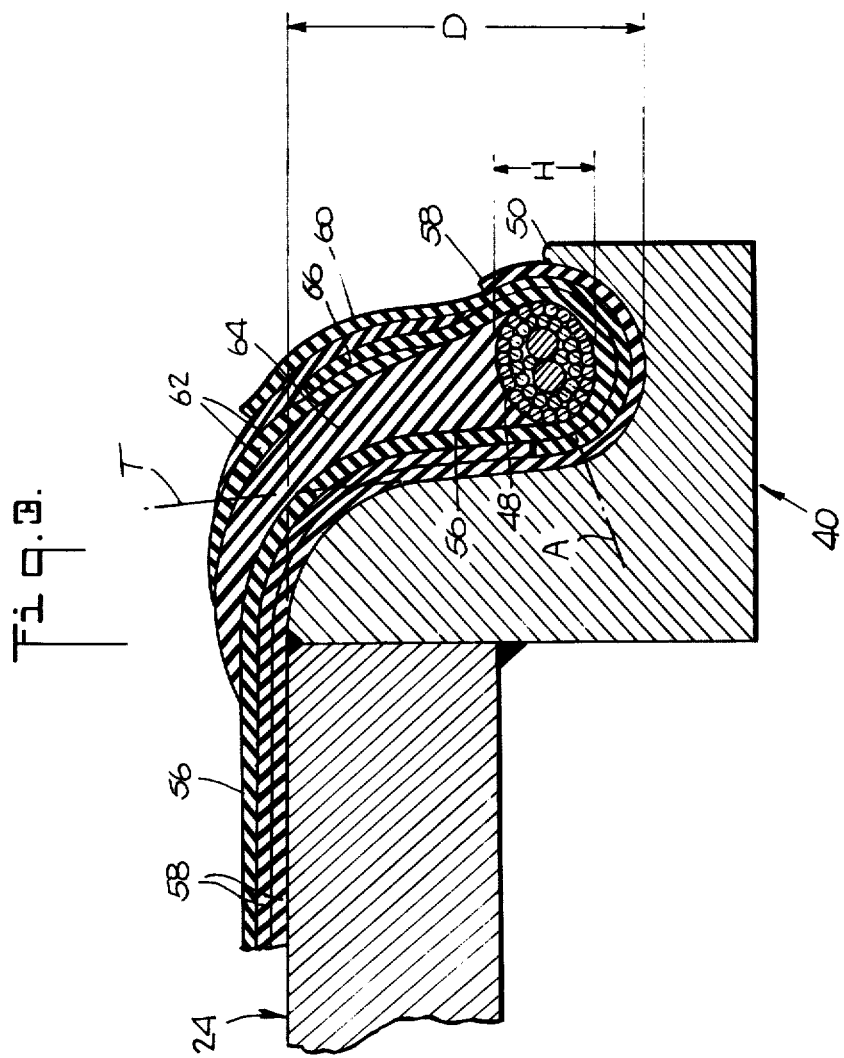
FIG. 3 is a schematic, fragmentary, axially taken cross-sectional view of a single one of the drum segments and the association of the bead-seat portion thereof with an annular metallic core and a corresponding apex strip.

In this respect, when building pneumatic tires for heavy service vehicles, which tires require somewhat larger beads than those beads which are used for multiply bias tires, such tires for the heavy service vehicles are built usually with a pair of single annular metallic bead cores on a monoply carcass, the single bead-core construction, in cross-section, presenting a generally oval configuration. Such an oval configuration of an annular bead-core of metallic construction is illustrated in FIG. 3 and denoted generally by the reference character 48. As shown, the major axis A of the bead-core 48 is slightly inclined with respect to horizontal. As a result, it is preferred that the exposed outer surface of the recesses 42 of each of the flanges 40 be rounded with a substantially part-oval extent having a major axis which is parallel to the axis A of the bead-core 48.

Moreover, it is preferred that the radial-depth D from the outer surface of the segments 24 to the bottom-most portion of any of the recesses 42 be in excess of three times the radially directed thickness H of each bead-core 48. It is furthermore preferred that the extreme up-turned end 50 of each of the segments 24 terminate at a point such that each of the recesses 42 embraces the bead-core 48 vertically over an extent of substantially 180° across the mid-section of the bead-core 48. It is also preferred that the substantially vertically extending shoulder wall-portion 52 of each of the recesses 42 be somewhat inclined from the radial direction by approximately 5° as shown by the tangent line T in FIG. 3.

In operation of the drum 10 of the present invention, the segments 24 are initially disposed in their most fully contracted position such that they substantially circumferentially abut one another. It is the garter springs 30 and the linear coil springs 32 which cooperate with one another that urge the segments 24 to their most fully contracted condition as illustrated in the lower portion of each of FIGS. 1 and 2. A steel-reinforced, radial monoply 56 (FIG. 3) is then wound in cylindrical fashion upon the segments 24 such that the steel cords or cables which are parallel to one another in the monoply extend parallel to the axis of the drum 10. The monoply has an axial span such that its opposite end portions extend over and beyond the fingers 46 of each of the inextensible drum portions 44 and onto the latter portions 44.

It will be understood, that in most instances a rubber liner (such as the liner 58) is first wound upon the drum 10. Thereafter, the steel-reinforced monoply 56 is wound upon the liner 48, the liner 48 and the monoply 56 together forming a cylinder enveloping the drum 10. Additional strips of rubber material, such as the chafer strips 60 and rubber cushions 62, are then wound upon each of the opposite end portions of the steel-reinforced monoply in near radial alignment with each of the recesses 42 of the flanges 40.

The carcass of the monoply and its associated liner and strips is then in a condition for receiving a pair of carcass-bead-defining annular metallic cores (such as the core 48), one such core surrounding and radially aligned with each of the recesses 42 of the flanges 40. It will be understood that the inner diameter of each of the annular metallic cores 48 is slightly greater than the outer diameter presented by the circumferential array of segments 24 when the latter are in their most fully contracted condition as illustrated in the lower portion of FIGS. 1 and 2. It will also be understood that the annular metallic cores 48 are each provided with, or have secured thereto, a triangular-like, annular apex strip such as that denoted by the reference character 64 in FIG. 3.

The bladder 34 is then expanded to a condition as illustrated in the upper portion of FIG. 1 by introducing pressurized fluid through the hose 36 into the bladder 34. As the bladder 34 is expanded, the segments 24 are caused to shift radially outwardly and ultimately assume the expanded disposition as illustrated in the upper portion of each of FIGS. 1 and 2. As the segments 24 are expanded outwardly, the cylindrically oriented, steel-reinforced, radial monoply 56 is caused to expand likewise. During such expansion, the steel cords or cables of the monoply 56 are separated slightly in parallel relation. Moreover, once the surface of each of the recesses 42 of the flanges 40 engages the inner surface of the liner 58 of the steel-reinforced monoply 56, the various strips surrounding the monoply 56, such as the rubber cushions 62 and chafer strips 60, are caused to bend with the monoply end portions 66 around the inner surface of each of the annular metallic cores 48 to anchor each of such cores to the monoply.

As the strips and the end portions 66 of the monoply turn-up relative to the cores 48, the portions of each of the steel cords or cables in the monoply 56 which are axially beyond the cores 48, and which generally overlie the inextensible drum portions 44, are caused to flare relative to one another and anchor each of the annular metallic cores 48 to the monoply 56. It will be understood that the outermost expanded condition of the segments 24 is determined at least in part by the engagement of each of the recesses 42 of the flanges 40 with their corresponding annular-bead cores 48 through the intermediary, of course, of the monoply and its associated bead-region strips. Safety abutment means, not shown, may also be provided to limit the outward radial displacement of the segments 24.

As illustrated in FIG. 2, the shouldered wall-portion 52 of each of the recesses 42 extends substantially perpendicular to the axis of the drum 10, but is slightly inclined as much as 5° from the perpendicular to the axis of the drum 10. As a result, the apex strip 64 over most of its extent is constrained in an orientation which is likewise substantially perpendicular to the axis of the drum 10, which orientation is quite near the orientation that the apex strip normally assumes when the first-stage carcass is transformed into a second-stage carcass and vulcanized in the form of a torus. The benefit derived from forming the first-stage carcass with the apex strip 64 in an orientation as illustrated in FIG. 3 is that the apex strip 64 (and each carcass end portion 66) need not be rotated substantially relative to its corresponding bead-core 48 subsequently when transformed into a second-stage carcass and vulcanized. The rotation would otherwise deform the bead-region such that the bead-region is distorted and wrinkled to an extent which may interfere with the quality of the pneumatic tire ultimately fabricated.

Moreover, because of the rigid nature of each of the flanges 40 and particularly of the non-deformable outer surface thereof which forms each recess 42, the steel cables or cords which reinforce the monoply 56 are easily turned up relative to the bead-core 48 with well-defined predictable dimensions, without wrinkling or other distortion in the bead-region. In particular, the end portions of the monoply 56 expand neatly around each bead-core 48 without distortion or wrinkling and are caused to assume a near vertical orientation which is substantially perpendicular to the axis of the drum 10 leaving only a minor distance over which such end portions of the monoply 56 and the latter's associated strips have to thereafter be turned and stitched against the apex strip 64 to effectively anchor the bead-cores 48 in the bead-regions.

Moreover, because of the substantial distance between the outer surface of the segments 24 and the lowermost portion of each of the recesses 42, or more particularly the distance D which is substantially three times the thickness H of the bead-cores 48, the monoply 56 is caused to undergo a substantial expansion with the expansion of the segments 24, and the free-end portions of the monoply 56 are caused to be stretched taut and conform precisely to the configuration of the bead-cores 48 to most effectively anchor the latter to the monoply 56. Furthermore, because of the upward extent of the upturned-end 50 of each of the flanges 40, which extent results in the recesses 42 vertically embracing their respective bead-cores 48 over substantially 180° of the bead-cores 48 across the bead-core mid-sections, the end portions 66 of the monoply 56 are caused to assume a near vertical orientation perpendicular to the axis of the drum 10 to effectively initially anchor their corresponding bead-cores 48 to the monoply 56.

The present invention, thus, provides means for building a steel-reinforced, radial monoply, first-stage carcass that has neatly-formed, wrinkle-free, well-anchored, bead-regions that are predictably uniform and do not vary from one carcass to another.

Having thus set forth the nature of the present invention, it will be understood that the foregoing description of a preferred embodiment of the present invention is for purposes for illustration only and that the various structural and operational features and relationships herein disclosed are susceptible to a number of modifications and changes none of which entails any departure from the spirit and scope of the present invention as defined in the hereto appended claims.

What is claimed is:

1. A building drum for building a first-stage, steel-reinforced, radial monoply, pneumatic tire carcass, whereby two specified carcass-bead-defining annular metallic cores are secured to the opposite end portions, respectively, of a cylindrically-oriented carcass-monoply, said drum comprising a circumferential array of drumforming segments, guide means supporting said segments for radial displacement to and from contracted and expanded dispositions, and shifting means for displacing said segments radially between said contracted and expanded dispositions, each of said segments having the same axial extent and terminating at each end in a respective flange projecting radially inwardly, each of said flanges having a respective recess exposed radially outwardly, corresponding ones of said recesses which are at the same segment end defining cooperatively with one another at each such segment end a radially outwardly exposed annular bead-seat, said segments when in a fully contracted disposition presenting a substantially cylindrical outer carcass-ply supporting surface having an outer diameter which is less than the inner diameter of any of said specified carcass-bead-defining annular metallic cores to be thereby operated upon, said bead-seats each having an inner diameter which is less than said outer diameter of said outer carcass-ply support-surface, said bead-seats each being entirely rigid and, thereby, having a depth-to-width ratio that does not vary with the expansion and contraction of said segments, the depth of each of said bead-seats measured radially from said outer carcass-ply support-surface to the radially innermost portion of said bead-seats being in excess of three times the radially directed thickness of any of said specified carcass-bead-defining annular metallic cores to be thereby operated upon.

2. A building drum as claimed in claim 1, wherein each of said bead-seats, in cross-section axially of said segments, has an arcuate extent sufficient to vertically embrace a respective carcass-bead-defining annular metallic core over approximately 180° across the mid-section of said core.

3. A building drum for building a first-stage, steel-reinforced, radial monoply, pneumatic tire carcass, whereby two carcass-bead-defining annular metallic cores are secured to the opposite end portions, respectively, of a cylindrically-oriented carcass-monoply, said drum comprising a circumferential array of drum-forming segments, guide means supporting said segments for radial displacement to and from contracted and expanded dispositions, shifting means for displacing said segments radially between said contracted and expanded dispositions, each of said segments having the same axial extent and terminating at each end in a respective flange projecting radially inwardly, each of said flanges having a respective recess exposed radially outwardly, corresponding ones of said recesses which are at the same segment end defining cooperatively with one another at each such segment end a radially outwardly exposed annular bead-seat, said segments when in a fully contracted disposition presenting a substantially cylindrical outer carcass-ply support-surface having an outer diameter which is less than the inner diameter of any carcass-bead-defining annular metallic core to be thereby operated upon, said bead-seats each having an inner diameter which is less than said outer diameter of said outer carcass-ply support-surface, said bead-seats each being entirely rigid and, thereby, having a depth-to-width ratio that does not vary with the expansion and contraction of said segments, said guide means including an axially extending hub portion, a pair of axially spaced, but radially extending, annular plates affixed to said hub portion, and means for defining a radial array of equidistantly spaced slots arranged on each of said annular plates, each of said segments including a respective radially extending leg affixed thereto at one leg end portion and movably confined at the other leg end portion in a respective one of said slots, and a cylindrical member affixed to and bridging said annular plates, said shifting means including an annular inflatable bladder interposed between said cylindrical member and said circumferential array of drum-forming segments, each of said segments including an arcuate shield presenting a concave surface which is engageable with said bladder, said shields overlapping one another throughout the complete displacement of said segments to and from said contracted and expanded dispositions and, thereby, preventing portions of said bladder from squeezing radially outwardly between said segments.

* * * * *